Aug. 31, 1965    J. A. BIALICK    3,203,421
INCONTINENCE CLAMP DEVICE
Filed Jan. 30, 1964
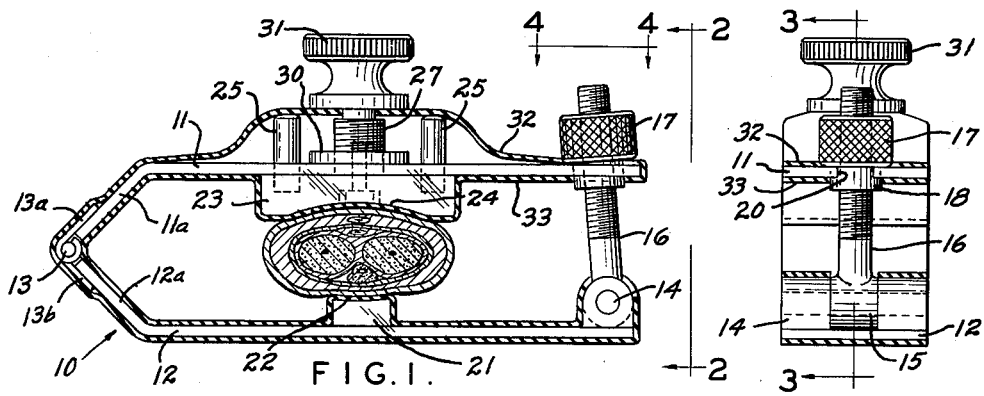
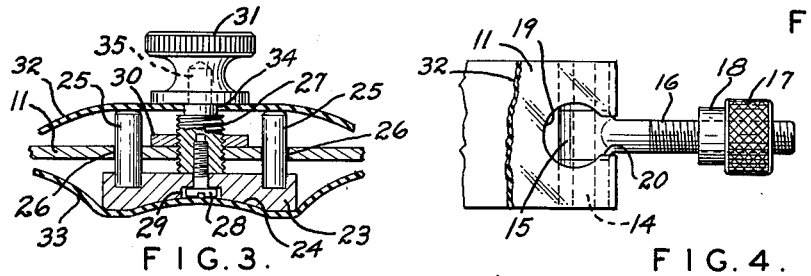
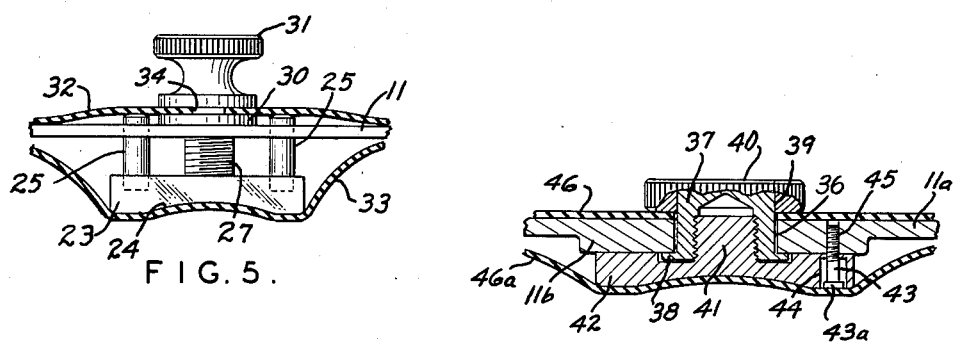
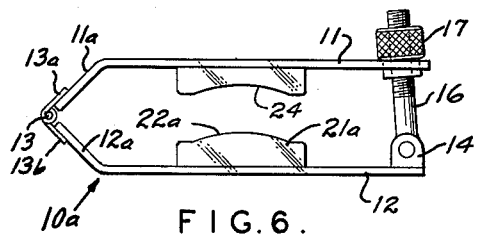
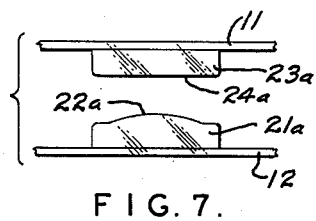
INVENTOR.
JAY ARTHUR BIALICK
BY
Gravely, Lieder & Woodruff
ATTORNEYS

United States Patent Office 3,203,421
Patented Aug. 31, 1965

3,203,421
INCONTINENCE CLAMP DEVICE
Jay Arthur Bialick, 7133 Dartmouth Ave.,
University City 30, Mo.
Filed Jan. 30, 1964, Ser. No. 341,210
2 Claims. (Cl. 128—346)

This invention pertains to clamp devices for checking the flow of fluids through a conduit in a human member.

Devices of this general class are known, but each has its shortcomings and objections. For example, elastic devices of the type disclosed in Means U.S. Patent No. 2,756,753, granted July 31, 1956, apply too great a pressure and the elastic is not controllable as it should be for comfort while closing the conduit. Certain other devices include sponge rubber pads and ratchet type clamps, neither of which is satisfactory as the sponge rubber hardens with use and flattens. Sponge rubber also is impossible to clean and, therefore, is unsanitary and requires too frequent adjustment. The ratchet clamp is much too coarse to afford the proper position for comfort commensurate with effective closure.

It is an object of the present invention to provide an incontinence clamp device which improves upon the general class of such devices heretofore devised for the essential purpose in view.

It is also an object of this invention to provide a clamp device of the class indicated which can be rendered sterile, can be cleaned easily, and which can be variably adjusted to the required degree for effectiveness without discomfort.

It is an object of this invention to provide a clamp device which can be quickly adjusted to suit the user by adjustment means which is reliable and not subject to change with use.

A device of the foregoing character may consist of a body having movable arms each of which supports pressure exerting means for engaging the human body member, with said means arranged in cooperating opposed relation for clamping the body member therebetween, an adjustable and releasable type coupling means interconnecting the movable arms so that the arms may be opened, and another adjustment means associated with one of the movable arms to set the pressure exerting means in effective positions. The body of the device and the adjustment means are so arranged that precise positioning of the device is easily obtained and the degree of clamping pressure is also precisely achieved.

It is, therefore, a still further object of the present invention to provide a clamping device of the class indicated in which the adjustment means does not lose its effectiveness after a period of use.

Certain preferred embodiments of the present device, and the advantages thereof, will be disclosed in the following specification when taken with the accompanying drawings, wherein:

FIG. 1 is a side elevational view of the clamp device showing the arrangement of its parts, a protective sheath therefor being shown in section;

FIG. 2 is an end elevation taken at line 2—2 in FIG. 1, the sheath being omitted;

FIG. 3 is a greatly enlarged fragmentary sectional view taken at line 3—3 in FIG. 2, but with portions of the sheath included;

FIG. 4 is a fragmentary view of the device in its unlocked position, the view being taken along line 4—4 in FIG. 1;

FIG. 5 is a fragmentary view in elevation of the device of FIG. 1, showing an adjusted position differing from FIG. 1;

FIG. 6 is a side elevational view of a modified clamp device, similar to FIG. 1 but without the sheath thereon;

FIG. 7 is a fragmentary view of a device of either FIG. 1 or FIG. 6, but with modifications as to the conformation of pressure exerting elements; and FIG. 8 is a fragmentary view of a modified means for adjusting a pressure means in a clamp of the character shown in FIG. 1.

In FIGS. 1 and 2, the clamp device 10 is seen to have a pair of flat arms 11 and 12 movably connected at the angularly converging ends 11a and 12a by a suitable hinge 13 having the hinge leaves 13a and 13b secured to the ends 11a and 12 respectively. The opposite end of arm 12 carries a barrel hinge 14 to which is swingably connected the base eye 15 of a threaded stem 16. The stem 16 supports an adjustment nut 17, and the nut is provided with a reduced diameter portion or collar 18. The adjacent end of arm 11 is provided (FIG. 4) with a key-hole opening having a circular portion 19 and an outwardly opening slot 20. As may be seen in FIGS. 1, 2 and 4, the stem 16 is pivotally movable through its eye 15 about the axis of the barrel hinge 14 such that the threaded stem 16 may move into or out of the slot 20. When moved into the slot 20, the stem may be located in the circular opening 19 to allow the nut collar 18 to fit into such opening with a snug fit, thereby coupling the arms together by securing the stem 16 against outward movement since the collar 18 is too large to pass through the slot 20. The nut 17 may be threaded on the stem 16 to draw the arms 11 and 12 relatively inwardly in whatever adjustment is desired. The human body member is disposed between the arms 11 and 12 and offers resistance to the arms moving toward each other so that the pressure exerting means will become effective, as will now appear.

The device 10 is provided with a pressure exerting means, such as element 21 carried on arm 12, the element being formed with a concave face 22 to engage on a limited area of the human body member. Opposite element 21 is a second pressure exerting means or element 23 also having a concave face 24 to engage on a limited area of the human body member. The element 23 is adjustably mounted (FIG. 3) on arm 11 by guide pins 25 which are fixed to the body of the element and move through suitable apertures 26 in the arm 11. Element 23 is moved by a jack screw 27 which is rotatably engaged in the body of the element 23 by a holding screw 28 which is free to turn in the recess 29 in said elemnt 23. The jack screw 27 has threaded engagement in a fixed washer 30 carried by arm 11, and the outer end is connected to a thumb nut 31, whereby the element 23 may be moved toward or away from the arm 11 guided by the pins 25 which prevent rotation of the element 23.

As may be seen in FIGS. 1, 3 and 5, the device 10 is provided with a protective sheath having an outer portion 32 and an inner portion 33. The two portions 32 and 33 may be molded together to provide a moisture or liquid proof covering for the stuctural parts of the device. The sheath may be made of natural rubber or any of the synthetic plastic materials having moisture impervious and elastic characteristics. The outer portions 32 of the sheath is provided with an aperture 34 (FIG. 3) to receive the upper stem 35 of the jack screw where the stem enters the thumb nut 31. The sheath around the aperture 34 hugs the stem 35 so as to form a moisture barrier therefor. It is also noted that the elastic nature of the sheath allows stretch sufficient to care for the threading movement of the jack screw 27. The inner sheath portion 33 encases the element 23 and stretches in conformity with the movement thereof, while also covering and conforming to the shape of the face 24.

The device 10a shown in FIG. 6 conforms substantially to device 10, but is not shown with means for adjusting the element 23. Other parts are like device 10 and similar reference numerals are used to point out similar parts. In arranging the element on arm 12, the element shown at 21a is formed with a convex face 22a so that a more concentrated area for pressure may be obtained. It is, of course, understood that the element 21a may be substituted in the device 10 of FIG. 1 for element 21. Other shaped elements may be provided as, for example, the element 23a in FIG. 7 having a flat face 24a. The modified element 23a is shown cooperating with element 21a of FIG. 6.

In a clamp device 10 of the present character, it is essential to have arms 11 and 12 formed of stiff material so that there will be little or no flexing thereof, as flexibility will introduce an uncontrollable degree of pressure upon the pressure elements and render the adjustments at nuts 17 and 31 uncertain. While metal is more nearly suitable as the desired material, it requires the protective sheath for sanitary reasons. Plastic materials may be used, in which case the sheath may be dispensed with.

In FIG. 8 there is shown a modified adjusting means for the clamp of FIG. 1. The modified means is more compact and can be formed of lightweight metal or plastic parts. As shown, the arm 11a is formed with or has a thickened portion 11b in which a large and a small aperture is formed. The large aperture 36 receives a rotatable thimble 37 having a flange 38 on its open end. The closed end of the thimble projects beyond the arm 11a and is suitably formed to have a non-rotative fit in the center opening 39 in a thumb wheel 40. The thimble 37 has a threaded bore to receive the threaded stem 41 of the movable element 42. After the stem 41 is threaded up in the bore so that the element 42 is against the thickened portion 11b of the arm 11a, a guide and stop pin 43 is loosely fitted through an aperture 44 in the element 42 so that it can thread into the small aperture 45 in the arm 11a. Upon rotation of wheel 40, the element 42 is moved away from the arm by the unthreading action on the stem 41 while the pin 43 prevents the element 42 from rotating. The pin 43 has an enlarged head 43a which is spaced from the inner restricted end of bore 44 so that the element 42 may move out to the extent permitted by the head 43a. The movable portions of the assembly, except the wheel 40, can be enclosed in a sheath 46, of which the inner portion 46a is adapted to yield with the adjustments desired for the element 42.

In the devices of FIGS. 1 or 8, the application to a human body member is carried out by first setting the adjustable pressure element 23 or 42 as desired. After this operation, the releasable means 16–17 can be adjusted to the required setting to effect the closure of the conduit in the human body member. Thereafter, only the means 16–17 need to be manipulated when applying or removing the device.

Devices made in keeping with the principles of this invention are well suited to achieve the degree of pressure required with the least discomfort. The pressure applying elements afford the least area of constriction to the body member being clamped so that blood vessels are not unnecessarily clamped. It is therefore, the aim to include all possible variations of the structure of the improved clamp device, some of which have been herein disclosed, while others may be comprehended in and by the appended claims.

What is claimed is:

1. In a urethra clamp device the improvement of a body having a pair of elongated spaced and substantially parallel arms, means connecting said arms at common adjacent ends for movement toward and away from each other, said arms having opposite ends normally spaced from each other, pressure applying means comprising first and second pads each having inner surfaces adapted to cooperate to compress the urethra and cut-off flow, said first pad being fixed in position on one of said arms, means operably connected to said second pad and the other of said arms including a first element rotatable relative to said other arm, a second element connected to said second pad and to said first element and transmitting linear thrust therebetween to effect movement of said second pad selectively toward and away from said first pad, and a third element connected between said second pad and said other arm to slide relative on one of the latter and fix said second pad against angular displacement during linear movement, said inner surfaces being in spaced facing relation and substantially opposite each other and adapted to receive the urethra therebetween and one of said inner surfaces being concave relative to the other inner surface, and infinitely adjustable releasible connecting means joining said normally spaced opposite ends of said arms to cause said first and second pads to compress the urethra between said inner surfaces.

2. In a urethra clamp device the improvement of a body having elongated and substantially rigid, non-bendable arms spaced from each other and having first ends spaced apart and second ends interconnected to allow arm movement toward and away from each other to vary the spacing between said first ends, non-compressible pressure applying means comprising first and second pads each having an inner surface, said first pad being fixed in position on one of said arms, means operably connected to said second pad and the other of said arms including a first element operably carried by said other arm and rotatable relative thereto, a second element fixed to said second pad and threadedly connected to said first element to transmit linear thrust therebetween and effect movement of said second pad selectively toward and away from said first pad, and a third element connected between said second pad and said other arm to slide relative to one of the latter and fix said second pad against angular displacement during linear movement, a covering over said arms and pads to protect the same against moisture and foreign matter, said inner surfaces on said first and second pads being in spaced facing relation substantially opposite each other and adapted to receive the urethra, and releasible means interconnecting said first spaced ends and including means infinitely adjustable to vary the urethra compression.

References Cited by the Examiner

UNITED STATES PATENTS

| 1,728,322 | 9/29 | Badrian | 128—346 |
| 2,618,270 | 11/52 | Pearson | 128—346 |
| 2,686,520 | 8/54 | Jarvis et al. | 128—346 |
| 2,756,753 | 7/56 | Means | 128—346 |
| 2,810,012 | 10/57 | Sugarman | 174—162 X |
| 3,050,064 | 8/62 | Moore et al. | 128—327 |

OTHER REFERENCES

Cunningham Incontinence Clamp #405 from pgs. 21–22 of Bard Catalogue for Urological Instruments, 8th Edition, 1938.

A.C.M.I. Catalogue, 1952, pg. 213 "Foley Mechanical Incontinence Clamp," Item #4894.

RICHARD A. GAUDET, *Primary Examiner.*